United States Patent
Matsui et al.

(10) Patent No.: US 6,985,544 B2
(45) Date of Patent: Jan. 10, 2006

(54) DIVERSITY RECEIVER

(75) Inventors: Masaki Matsui, Tokyo (JP); Muneki Ito, Tokyo (JP); Akio Horibe, Tokyo (JP); Shigeo Sato, Tokyo (JP)

(73) Assignee: Uniden Corporation, Tokyo (JP)

( * ) Notice: Subject to any disclaimer, the term of this patent is extended or adjusted under 35 U.S.C. 154(b) by 39 days.

(21) Appl. No.: 10/729,372

(22) Filed: Dec. 8, 2003

(65) Prior Publication Data

US 2005/0059431 A1 Mar. 17, 2005

(30) Foreign Application Priority Data

Sep. 12, 2003 (JP) .................................... 2003-321937

(51) Int. Cl.
*H04B 7/10* (2006.01)

(52) U.S. Cl. ...................... 375/347; 375/267; 375/144; 375/148; 455/135; 455/277.2

(58) Field of Classification Search ................ 375/347, 375/267, 144, 147, 148; 455/132, 135, 277.2, 455/277.1
See application file for complete search history.

(56) References Cited

U.S. PATENT DOCUMENTS

| | | | | |
|---|---|---|---|---|
| 5,239,541 A | * | 8/1993 | Murai ........................ | 370/345 |
| 5,561,673 A | * | 10/1996 | Takai et al. .................. | 714/708 |
| 5,634,204 A | * | 5/1997 | Takahashi et al. .......... | 455/134 |
| 5,918,164 A | * | 6/1999 | Takahashi et al. .......... | 455/134 |
| 5,940,454 A | * | 8/1999 | McNicol et al. ............. | 375/347 |
| 6,385,181 B1 | * | 5/2002 | Tsutsui et al. .............. | 370/335 |
| 2002/0072343 A1 | * | 6/2002 | Miyatani ..................... | 455/272 |

FOREIGN PATENT DOCUMENTS

JP        2003-046418        2/2003

* cited by examiner

*Primary Examiner*—Temesghen Ghebretinsae
(74) *Attorney, Agent, or Firm*—Morgan, Lewis & Bockius LLP

(57) ABSTRACT

It is an object of the present invention to improve the diversity gain by conducting linear prediction of fading fluctuations and switching antennas. In order to attain this object, the diversity receiver in accordance with the present invention comprises a plurality of antennas for receiving wireless signals subjected to direct spread modulation, an antenna switch for conducting antenna connection switching thereof, a primary demodulator for demodulating the wireless signals and obtaining a spread spectrum signal, a matched filter for finding a correlation value of the spread spectrum signal and a spread code for demodulation, a mean value computation unit for finding a mean SNR of the received signal by converting the maximum correlation value to a value per 1 frame, an estimation unit for linear prediction of the SNR of the received signal based on the time series data of the mean SNR, and a level comparator for comparing the SNR of the received signal that was predicted by the estimation unit with a threshold value and outputting a control signal for conducting antenna switching to the antenna switch.

5 Claims, 3 Drawing Sheets

DIVERSITY RECEIVER

BACKGROUND OF THE INVENTION

1. Field of the Invention

The present invention relates to a diversity reception technology for wireless systems using a direct spread spectrum communication method.

2. Description of the Related Art

In mobile communications, fading occurs in a multipass environment. If fading occurs, the received input is subjected to significant level fluctuations and phase fluctuations of several tens of dB. As a result, a code error frequently occurs in digital transmission. Diversity reception methods were suggested as a fading countermeasure. Among such methods, antenna switching diversity is suitable for wireless systems requiring simplification of system structure, such as mobile stations. Japanese Patent Application Laid-open No. 2003-46418 disclosed a technology by which in a wireless system using spread spectrum communication, antenna switching is conducted by comparing a threshold value and an average maximum correlation value which is output by a matched filter, per 1 frame, thereby enabling diversity communication with excellent SNR (Signal to Noise Ratio). This technology is more effective than the method using RSSI (Receive Signal Strength Indicator) with respect to resistance to wave interference and even more effective in a band where a large number of wireless systems are co-present, for example, an ISM band (2.4 GHz band).

However, with the above-described prior art technology, it was impossible to predict the fading fluctuations and to conduct antenna switching before the reception signal level drops. In wireless communication under fading environment, it is important to predict fading fluctuations in advance and to conduct antenna switching before the reception signal level drops.

SUMMARY OF THE INVENTION

Accordingly, it is an object of the present invention to provide a diversity receiver capable of increasing the diversity gain by predicting fading fluctuations and conducting antenna switching.

In order to resolve the above-described problems, the diversity receiver in accordance with the present invention comprises a plurality of antennas for diversity receiving wireless signals that were subjected to direct spread modulation, an antenna switch for selecting any one of the plurality of antennas and conducting connection switching thereof, a demodulator for demodulating the wireless signals received via the antenna connected by the antenna switch and obtaining a spread spectrum signal, correlation value detection means for finding a correlation value of the spread spectrum signal and a spread code for demodulation, a mean value computation unit for finding a mean SNR of the received signal by converting the maximum correlation value which is output by correlation value detection means per 1 frame, storage means for storing the mean SNR, an estimation unit for linear prediction of the SNR of the received signal based on the time series data of the mean SNR stored in storage means, and a level comparator for comparing the SNR of the received signal that was predicted by the estimation unit with a threshold value and outputting a control signal for conducting antenna switching to the antenna switch. In accordance with the present invention, fading fluctuations can be predicted and antenna switching can be conducted before the received signal level drops, by estimating the SNR of the received signal. As a result, the diversity gain can be increased.

In the diversity receiver in accordance with the present invention, the estimation unit preferably estimates the SNR of the received signal by secondary interpolation conducted by curvilinear regression when the number of time series data of the mean SNR stored in said storage means is 3 or more. Estimating the SNR of the received signal by secondary interpolation conducted by curvilinear regression can increase the SNR estimation accuracy.

In the diversity receiver in accordance with the present invention, the estimation unit preferably estimates the SNR of the received signal by primary interpolation conducted by linear regression when the number of time series data of the mean SNR stored in the storage means is 2. Because primary interpolation allows the estimation of the SNR of received signal to be conducted faster than the secondary interpolation, the estimation of fading fluctuations is conducted effectively.

In the diversity receiver in accordance with the present invention, the level comparator preferably compares the mean SNR stored in storage means with a threshold value when the time series data number of the mean SNR stored in storage means is 1 and outputs a control signal for conducting antenna switching to the antenna switch. When the time series data number of the mean SNR stored in storage means is 1, linear prediction of the SNR of the received signal is impossible. Therefore, estimation of SNR can be conducted even faster than with the primary interpolation by comparing the mean SNR stored in the storage means with a threshold value.

In the diversity receiver in accordance with the present invention, the estimation unit preferably zero clears the time series data of the mean SNR stored in the storage means each time the antenna is switched. The accuracy of SNR estimation for the received signal can thus be increased.

DESCRIPTION OF THE PREFERRED EMBODIMENTS

Embodiment 1

Figure 1:
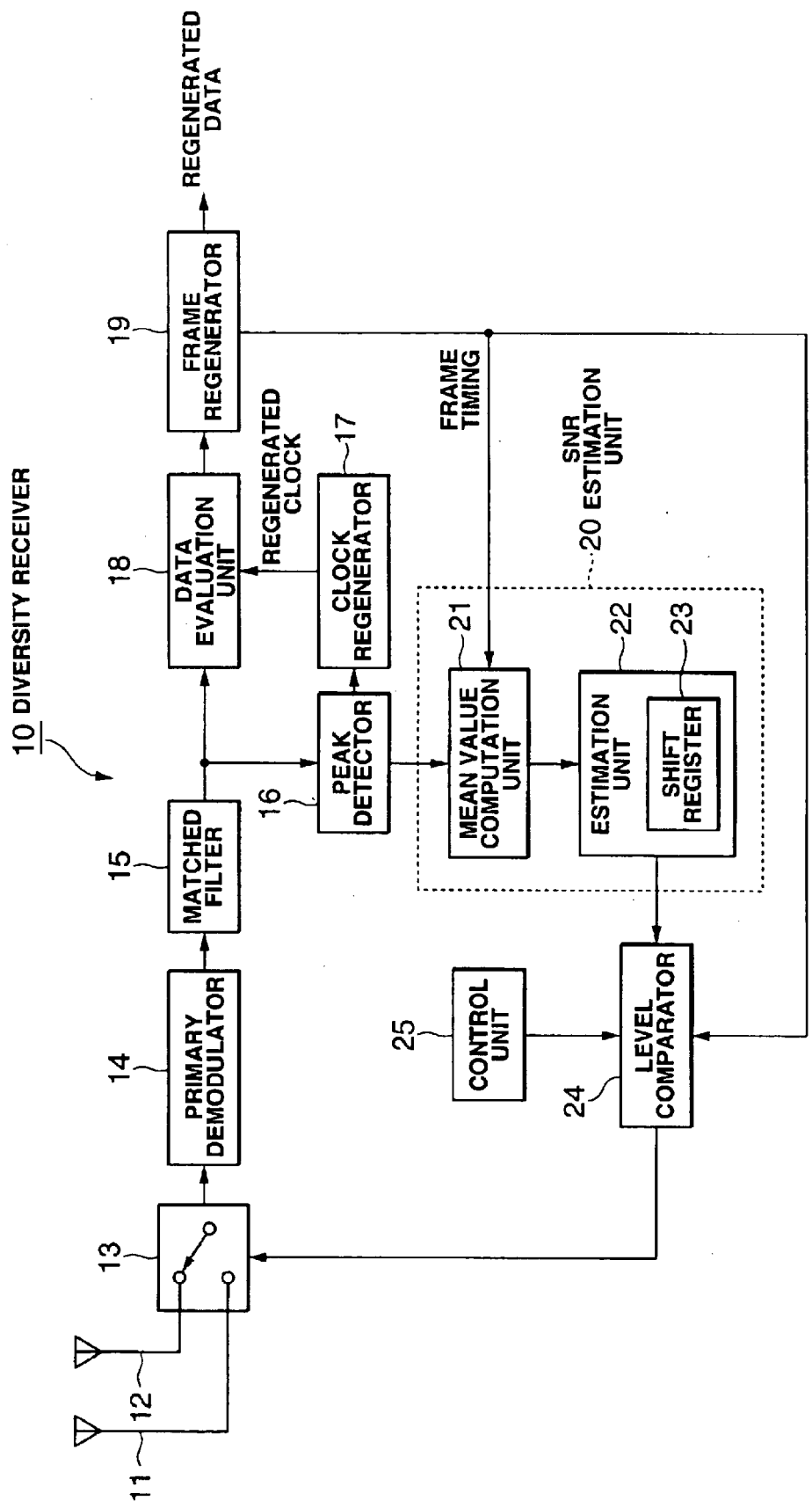
FIG. 1 is a functional block diagram of the diversity receiver of the first embodiment.

FIG. 1 is a functional block diagram of the diversity receiver used in the direct spread spectrum communication system. As shown in the figure, a diversity receiver 10 is composed mainly of a plurality of antennas 11, 12, an antenna switch 13, a primary demodulator 14, a matched filter 15, a peak detector 16, a clock regenerator 17, a data evaluation unit 18, a frame separator 19, a SNR estimation unit 20, a level comparator 24, and a control unit 25.

In direct spread spectrum communication, a spread spectrum signal of a base band is generated by multiplying the data which is to be transmitted by a spread code. At the transmitting side of the spread spectrum communication system, a wireless signal obtained by modulating the propagating wave (carrier) with this base-band spread spectrum signal (chip data) is transmitted. This wireless signal arrives at antennas 11, 12. The primary demodulator 14 demodulates the wireless signal received via the antenna 11 or 12 selected by the antenna switch 13 and supplies the chip data as a detection output to the matched filter (correlation value detection means) 15. The matched filter 15 finds a correlation value of the chip data and the spread code for demodulation having the pattern identical to that of the transmission side and outputs the maximum correlation value at a frequency equal to the bit rate of the transmitted data.

If the peak detector 16 detects a maximum correlation value (peak value) in a 1 bit interval of the received base-band spread spectrum signal, it outputs the detected pulse signal to the clock regenerator 17. The clock regenerator 17 regenerates the clock based on the detected pulse signal and outputs it into the data evaluation unit 18. The data evaluation unit 18 conducts regeneration of the transmitted data by identifying the output value of the matched filter 15 by the clock timing of a digital phase synchronization circuit (DPLL) composed of the peak detector 16 and clock regenerator 17. The restored bit data is incorporated as a frame data by the frame separator 19 and supplied to a last-stage circuit. The frame separator 19 supplies a frame timing signal to a mean value computation unit 21 and a level comparator 24.

The output signal of the peak detector 16 is a peak value for each one symbol in the matched filter output signal and, therefore, means an instantaneous SNR. The SNR estimation unit 20 is a circuit for conducting the estimation of SNR by using the matched filter output signal and outputting the estimated value into the last-stage level comparator 24, this circuit comprising the mean value computation unit 21 and the estimation unit 22. The mean value computation unit 21 finds the mean value of the peak level (mean SNR) by converting the peak level per 1 frame based on the enable signal (a frame timing signal supplied from the above-mentioned frame separator 19) designating the interval for computing the mean value of SNR. The mean computation unit 21 outputs the mean SNR of the received frames to the estimation unit 22 per each 1 frame. The estimation unit 22 comprises a shift register (recording means) and writes the data value of the mean SNR supplied from the mean value computation unit 21 in a time series mode. The estimation unit 22 estimates the SNR of the next frame which is to be received, by conducting linear prediction based on the time series data of the mean SNR written into the shift register 23.

Figure 2:
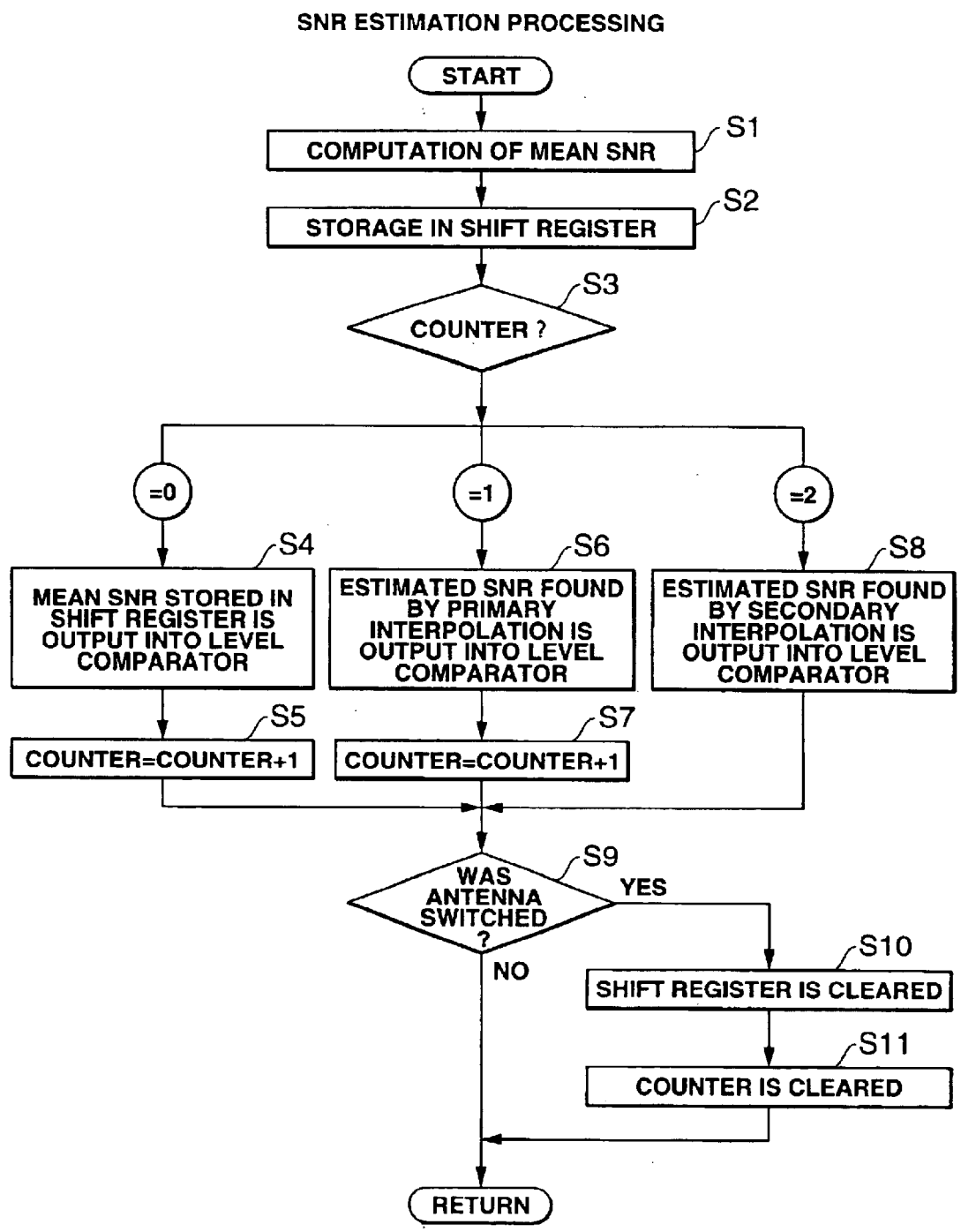
FIG. 2 is a flow chart illustrating the SNR estimation processing of the first embodiment.

FIG. 2 is a flow chart illustrating the SNR estimation processing routine. The SNR estimation unit 20 executed this routine repeatedly with the prescribed interval. In this routine, the mean SNR is first computed by the mean value computation unit 21 (step Si). Then, the estimation unit 22 stores this mean SNR in the shift register 23 (step S2) and checks which of "0", "1", "2" is the counter value (step S3). Here, if we assume that the mean SNR for N frames has been stored in the shift register 23, then the counter=0 when N=0, the counter=1 when N=1, and the counter=2 when N≧9.

Now, when the counter=0, only the mean SNR that was stored in step S2 is stored in the shift register 23. In other words, because the time series data number of the mean SNR stored in the shift register 23 is 1, the SNR of the next frame which is to be received cannot be predicted by linear prediction. Accordingly, in this case, the mean SNR stored in the shift register 23 is output into the level comparator 24 as a value for comparison with a threshold value serving as a reference for antenna switching (step S4). The estimation unit 22 then increments the counter by "1" (step S5).

When the counter=1, the mean SNR that was stored in step S2 and the mean SNR for 1 frame received heretofore are stored in the shift register 23. In other words, because the time series data number of the mean SNR stored in the shift register 23 is 2, the estimation unit 22 conducts primary interpolation by linear regression by using the mean SNR for 2 frames and estimates the SNR of the next frame which is to be received. The estimated value is output to the level comparator 24 as a value for comparison with a threshold value serving as a reference for antenna switching (step S6). The estimation unit 22 then increments the counter by "1" (step S7).

When the counter=2, the mean SNR that was stored in step S1 and the mean SNR for no less than 2 frames received heretofore are stored in the shift register 23. In other words, because the time series data number of the mean SNR stored in the shift register 23 is 3 or more, the estimation unit 22 conducts secondary interpolation by curvilinear regression by using the mean SNR for the 3 or more frames and estimates the SNR of the next frame which is to be received. The estimated value is output to the level comparator 24 as a value for comparison with a threshold value serving as a reference for antenna switching (step S8).

The comparator 24 compares a threshold value stored in the control unit 25 and the value (when the counter=0, a mean SNR of the received frame that was received just before the comparison; when the counter=1, 2, the estimated SNR predicted by the primary or secondary interpolation) supplied from the estimation unit 22, and when the mean SNR or estimated SNR is below the threshold value, outputs a control signal instructing the antenna switch 13 to conduct antenna switching. Furthermore the level comparator 24 controls the timing of antenna switching so that it is conducted within the guard time of the received frame, by acquiring a frame timing from the frame separator 19. Conducting antenna switching within the guard time makes it possible to suppress the generation of antenna switching noise.

The estimation unit 22 checks as to whether the antenna switching has been conducted (step S9). If the antenna switching has been conducted (step S9; YES), the estimation unit 22 zero clears (deletes) the shift register 23 (step S10) and then zero clears (resets) the counter (step S11), and the processing flow returns to step S1. On the other hand, if no antenna switching has been conducted (step S9; NO), the processing flow returns to step S1.

In the above-described explanation, the SNR was estimated by means of secondary interpolation by curvilinear regression and primary interpolation by linear regression, but the method for estimating the SNR is not limited to this method and a variety of estimation methods can be used for this purpose.

With the above-described embodiment, conducting linear prediction of SNR of the frame which is to be received next based on the time series data on the mean SNR of the frames that have been received in the past makes it possible to carry out antenna switching by predicting in advance the fall of the received signal level due to fading fluctuations. Furthermore, when the shift resistor 23 is cleared immediately after the antenna switching, in the SNR estimation using only the secondary interpolation, a minimum time of 3T is required to estimate the SNR of the received frame, where T is the time needed to compute the mean SNR, whereas with primary interpolation, a 2T time is sufficient to estimate the SNR of the received frame. If the mean SNR of the preceding received frame is used additionally, then the estimation can be conducted with a T time. When $f_d T$ is small ($f_d$ is a Doppler frequency of fading), then fading fluctuations during mean SNR computation can be ignored. Therefore, even if the shift register 23 is cleared immediately after the antenna switching, as in the present embodiment, sufficient measures can be taken against fading fluctuations by conducting the antenna switching control based on comparison of the threshold value and the SNR value estimated by using primary interpolation, or based on comparison of the threshold value and the mean SNR of the frame that was received just before the comparison.

Embodiment 2

Figure 3:
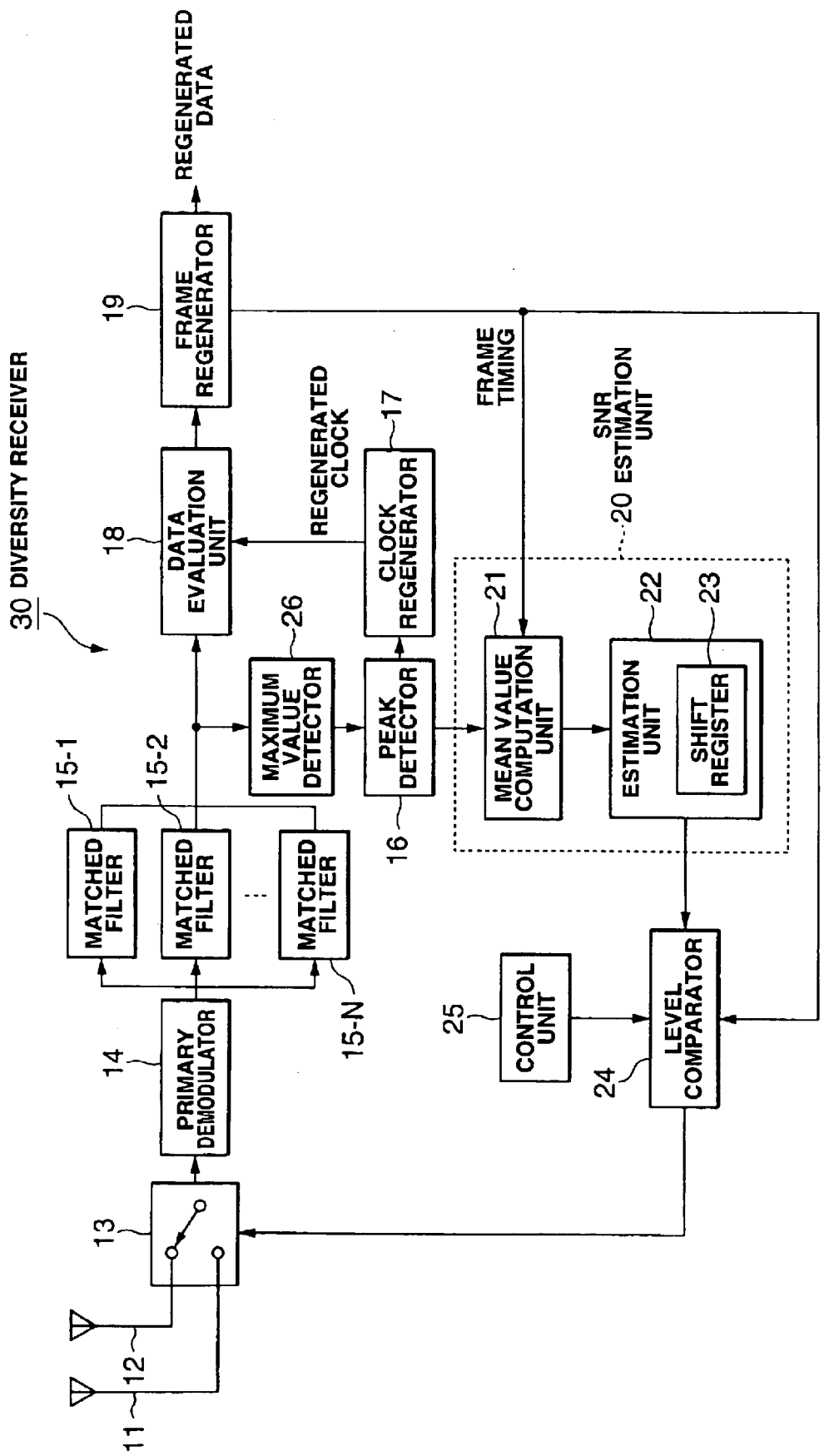
FIG. 3 is a functional block diagram of the diversity receiver of the second embodiment.

FIG. 3 is a functional block diagram of a diversity receiver in a M-ary/DS system. As shown in the figure, a diversity receiver 30 mainly comprises a plurality of antennas 11, 12, an antenna switch 13, a primary demodulator 14, a total of N matched filters 15-1, 15-2, . . . , 15-N, a peak detector 16, a clock regenerator 17, a data evaluation unit 18, a frame separator 19, a SNR estimation unit 20, a level comparator 24, a control unit 25, and a maximum value detection unit 26.

The primary demodulator 14 demodulates the wireless signal received via the antenna 11 or 12 selected by the antenna switch 13 and outputs the chip data as a detection output. A total of N matched filters 15-1, 15-2, . . . , 15N arranged in parallel, the number thereof corresponding to the M-ary system series number N, are connected to the last stage of the primary demodulator 14, and chip data is supplied to each matched filter 15-1, 15-2, . . . , 15-N. The maximum value detector 26 selects the maximum value from each output signal of matched filters 15-1, 15-2, . . . , 15-N for each sample data and outputs it to the peak detector 16. The peak detector outputs the maximum value of the output signals of matched filters within 1 symbol and the detection timing thereof to the clock regeneration unit 17 and SNR estimation unit 20. The supply of symbol clock regenerated in the clock regenerator 17 is received by the data evaluation unit 18 and data evaluation is conducted from the output signals of all the matched filters 15-1, 15-2, . . . , 15-N. The evaluated symbol data is included as frame data by the frame separator 19 and supplied to the circuit of the last stage. The SNR estimation unit 20 comprises a mean value computation unit 21 and an estimation unit 22. Because SNR estimation processing of received signals in the SNR estimation unit 20 and the antenna switching control in the level comparator 24 are conducted in the same manner as in the above-described first embodiment, detailed explanation thereof is omitted.

The diversity gain of the diversity receiver 30 under the Rayleigh fading environment was measured and evaluated. The mean SNR was compared with a threshold value at BER=1.0e-3 and an about 4 dB improvement in Eb/NO was obtained over the conventional technology (Japanese Patent Application Laid-open No. 2003-46418) for controlling the antenna switching. This was the result of conducting antenna switching after estimating the fall of the received signal level by linear prediction in the SNR estimation unit 20, and the possibility of estimating the fading fluctuations was thus confirmed. Furthermore, using a method employing a combination of the method for controlling the antenna switching by estimating the SNR by primary interpolation in addition to secondary interpolation and the method for controlling the antenna switching by comparing the mean SNR of the frame that was just received with a threshold value made it possible to obtain an about 0.5 dB improvement per BER=1.0e-4–1.0e-3 over the method for controlling the antenna switching by estimating the SNR by means of conducting only the secondary interpolation immediately after the antenna switching has been conducted, and this combination method was confirmed to be effective for SNR estimation under fading environment.

What is claimed is:

1. A diversity receiver comprising:
   a plurality of antennas for diversity receiving wireless signals subjected to direct spread modulation;
   an antenna switch for selecting any one of said plurality of antennas and conducting connection switching thereof;
   a demodulator for demodulating the wireless signals received via the antenna connected by said antenna switch and obtaining a spread spectrum signal;
   correlation value detection means for finding a correlation value of said spread spectrum signal and a spread code for demodulation;
   a mean value computation unit for finding a mean SNR (Signal to Noise Ratio) of the received signal by converting a maximum correlation value which is output by said correlation value detection means to a value per 1 frame;
   storage means for storing said mean SNR;
   an estimation unit for linear/evaluation of the SNR of the received signal based on a time series data of the mean SNR stored in said storage means; and
   a level comparator for comparing the SNR of the received signal that was predicted by said estimation unit with a threshold value and outputting a control signal for conducing antenna switching to said antenna switch.

2. The diversity receiver according to claim 1, wherein said estimation unit estimates the SNR of the received signal by secondary interpolation conducted by curvilinear regression when the number of time series data of the mean SNR stored in said storage is 3 or more.

3. The diversity receiver according to claim 1, wherein said estimation unit estimates the SNR of the received signal by primary interpolation conducted by linear regression when the number of time series data of the mean SNR stored in said storage means is 2.

4. The diversity receiver according to claim 1, wherein said level comparator compares the mean SNR stored in said storage means with a threshold value when the time series data number of the mean SNR stored in said storage means is 1 and outputs a control signal for conducting antenna switching to said antenna switch.

5. The diversity receiver according to claim 1, wherein said estimation unit clears the time series data of said mean SNR stored in said storage means to zero each time the antenna is switched.

* * * * *